United States Patent
Wu

(10) Patent No.: US 10,051,552 B2
(45) Date of Patent: Aug. 14, 2018

(54) METHOD FOR REALIZING RESOURCE ATTRIBUTE NOTIFICATION, AND COMMON SERVICE ENTITY

(71) Applicant: ZTE CORPORATION, Shenzhen (CN)

(72) Inventor: Hao Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/328,126

(22) PCT Filed: Oct. 21, 2014

(86) PCT No.: PCT/CN2014/089093
§ 371 (c)(1),
(2) Date: Jun. 19, 2017

(87) PCT Pub. No.: WO2015/117391
PCT Pub. Date: Aug. 13, 2015

(65) Prior Publication Data
US 2017/0318521 A1    Nov. 2, 2017

(30) Foreign Application Priority Data
Jul. 25, 2014    (CN) .......................... 2014 1 0360834

(51) Int. Cl.
*H04B 7/00* (2006.01)
*H04W 48/08* (2009.01)
(Continued)

(52) U.S. Cl.
CPC ............ *H04W 48/08* (2013.01); *H04W 4/005* (2013.01); *H04W 4/70* (2018.02)

(58) Field of Classification Search
CPC ............................... H04W 48/08; H04W 4/005
(Continued)

(56) References Cited

U.S. PATENT DOCUMENTS

2009/0217348 A1    8/2009  Salmela et al.
2013/0336222 A1    12/2013 Lu et al.
(Continued)

FOREIGN PATENT DOCUMENTS

CN    103299601 A    9/2013
CN    103618800 A    3/2014

OTHER PUBLICATIONS

Rajesh Bhalla et al., Document Name "oneM2M Functional Architecture Baseline Draft", Dated Jul. 17, 2014, Document No. oneM2M-TS-0001—V-o.9.0,    vol.    WG2—Architecuture, ARC, XP084006928, pp. 1-315. Retrieved from the Internet—URL:URL = http://member.onem2m.org/Application/documentapp/downloadimmediate/default.aspx?docID=7129.
(Continued)

*Primary Examiner* — Christopher R Crompton
(74) *Attorney, Agent, or Firm* — Plumsea Law Group, LLC

(57) ABSTRACT

The embodiment of present document discloses a method for implementing resource attribute notification and a common service entity. The method includes that: the common service (CSE) entity receives a resource update request, the resource update request containing an original resource address parameter and a parameter of an attribute able to be notified; and the CSE finds a corresponding original resource and an attribute thereof created locally according to the original resource address parameter; if it is judged that the parameter of an attribute able to be notified contains an attribute name of an attribute able to be notified, and the original resource has been notified to a remote CSE, but the original resource has not created "an attribute that has been notified", the CSE sends the resource update request to the remote CSE and carries a notification resource address of the original resource on the remote CSE, the attribute name of
(Continued)

the attribute able to be notified, and the attribute value stored locally.

19 Claims, 3 Drawing Sheets

(51) Int. Cl.
*H04W 4/00* (2018.01)
*H04W 4/70* (2018.01)
(58) Field of Classification Search
USPC ........................................................ 370/310
See application file for complete search history.

(56) References Cited

U.S. PATENT DOCUMENTS

2016/0219125 A1 7/2016 Xiao
2017/0180910 A1* 6/2017 Foti ..................... H04W 4/005
2017/0215023 A1* 7/2017 Ly ....................... H04W 4/001
2017/0223479 A1* 8/2017 Ly ............................ G06F 9/54

OTHER PUBLICATIONS

Qualcomm Inc (TIA) et al., "Corrections for non blocking requests. doc Change Request", Group Name ARC 12.0, Dated Jul. 28, 2014, vol. WG2—Architecture, ARC, XP084007010, pp. 1-14. Retrieved from the Internet—URL:URL = http://member.onem2m.org/Application/documentapp/downloadimmediate/default.aspx?docID-7215.
Extended European Search Report dated Jul. 4, 2017, Application No. 14881987.3-1854 / 3174318, Applicant ZTE Corporation, 12 pages.
PCT International Search Report dated Apr. 28, 2015, Application No. PCT/CN2014/089093, 3 Pages.

* cited by examiner

METHOD FOR REALIZING RESOURCE ATTRIBUTE NOTIFICATION, AND COMMON SERVICE ENTITY

CROSS-REFERENCE TO RELATED APPLICATIONS

This application is the U.S. national phase of PCT Application No. PCT/CN2014/089093 filed on Oct. 21, 2014, which claims priority to Chinese Patent Application No. 201410360834.3 filed on Jul. 25, 2014, the disclosures of which are incorporated in their entirety by reference herein.

TECHNICAL FIELD

The present document relates to the field of terminal communication technology, and more particularly to a method for implementing resource attribute notification and a common service entity.

BACKGROUND

A machine-to-machine (M2M) communication network consists of each M2M node and each bearer network. M2M nodes implement communication with each other through the bearer network. One M2M node contains at least one Application Entity (AE) or a Common Service Entity (CSE). The application entity is a logical unit that performs the actual M2M applications. The common service entity is a logical unit that manages and serves the application.

The communication between the M2M applications is implemented by the interaction between Common Service Entities (CSEs). The M2M applications are registered to the CSE, the CSMs need to register with each other, and then the interaction of the M2M applications can be implemented through the communication between the CSEs. The M2M system architecture diagram is shown in FIG. 1. In the M2M system architecture, the application node is the end implementation node, such as a smart meter, a temperature measurement and control sensor, a fire alarm, a smart appliance, and etc., the intermediate node is a middleware connecting the end implementation node to the server at the network side, such as gateway, the base node is a server at the network side, and the application registered to the base node can be a management platform of the M2M service provider.

In a practical application, the application entity AE on the application node needs to be registered to the common service entity on the application node, with no need of being registered to the common service entity of the intermediate node and the common service entity of the base node. The CSE to which AE is registered is referred to as a local CSE, and the other CSEs beside that CSE are referred to as remote CSEs. To implement communication between one CSE and another CSE, the CSE shall also be registered on the CSE with which it is to communicate. When CSE1 is registered to CSE2, CSE2 is referred to as local CSE of CSE1. After the registration is complete, AE or CSE may create resources on its local CSE. Typically, the resource created on the local CSE is referred to as the original resource, and the resource created on the remote CSE by way of notification is referred to as the notification resource. In the related technology, when the application on the base node needs to find the application on the application node, a request is sent to all the intermediate nodes connected to the base node. In order to facilitate the intermediate node to find the resource on the application node, a notification resource corresponding to the original resource on the application node is created on the intermediate node by way of resource notification. The notification resource has the same "search label" as that of the original resource, and may be linked to the "original resource address", so that the intermediate node may conveniently find the desired resource and may be linked to the "original resource address" according to the notification resource to access the original resource. Correspondingly, the attribute of "has been notified to" created on the original resource is used to indicate which remote CSEs the original resource has been notified to.

For example, the application entity AE sends a resource creation request to the local CSE, and the request message contains the resource type parameter and the attribute parameters (attribute 1, attribute 2, . . . ). After the local CSE receives the resource creation request, it creates the application type resource "AE1" for the AE, and creates each attribute according to the indication of the attribute parameters. For example, create attribute 1 of which the attribute name is "application name" and the attribute value is set to "myApplication", create attribute 2 of which the attribute name is "application ID" and the attribute value is set to "AE-ID", create attribute 3 of which the attribute name is "has been notified to" and the attribute value will be set after a response returned by the remote CSE is received. That is, first, the notification resource creation request message is sent to the remote CSE address given in the attribute parameter "has been notified to" of the resource creation request. After the remote CSE receives the notification resource creation request message, a notification resource "AE1_Annc" is created on the remote CSE, a response message is sent to the local CSE, and the response message contains the address of the notification resource "AE1_Annc". After the local CSE receives the response message, it stores the received address of the notification resource in the attribute "has been notified to" of the resource "AE1".

In the related art, although the notification resource is created on the remote CSE, the attribute of the resource is not created on the remote CSE. Therefore, if the attribute of the resource is queried on the remote CSE, the address of the original resource needs to be linked to complete the query. The query speed is slow, and the efficiency is low.

SUMMARY

The embodiment of the present document provides a method for implementing resource attribute notification and a common service entity, which can facilitate the remote query of the attribute of the resource and improve the speed and efficiency of the remote query.

A method for implementing resource attribute notification includes the following steps:

a common service entity (CSE) receives a resource update request, herein the resource update request contains an original resource address parameter and a parameter of an attribute able to be notified; and the CSE finds a corresponding original resource and an attribute thereof created locally according to the original resource address parameter, and when it is judged that the parameter of an attribute able to be notified contains an attribute name of an attribute able to be notified, and the original resource has been notified to a remote CSE, but the original resource has not created "an attribute that has been notified", the CSE sends the resource update request to the remote CSE and carries a notification resource address of the original resource on the remote CSE, the attribute name of the attribute able to be notified, and the attribute value stored locally.

Alternatively, the method further includes the following features:

when the CSE judges that the parameter of an attribute able to be notified contains an attribute name of an attribute able to be notified, and the original resource has been notified to a remote CSE, but the original resource has not created "an attribute that has been notified", after the CSE sends the resource update request to the remote CSE, the method further includes that:

when the CSE receives a response for indicating the successful creation of an attribute, the attribute of "the attribute that has been notified" is created for the original resource, and the attribute name of the attribute able to be notified successfully created is stored in the attribute of "the attribute that has been notified" of the original resource.

Alternatively, the method further includes the following features:

when the CSE judges that the parameter of an attribute able to be notified contains an attribute name of an attribute able to be notified, and the original resource has been notified to a remote CSE, but the original resource has not created "an attribute that has been notified", while or after the CSE sends the resource update request to the remote CSE, the method further includes the following step:

the CSE creates the attribute of "the attribute that has been notified" for the original resource; and when receiving a response for indicating the successful creation of an attribute, stores the attribute name of the attribute able to be notified successfully created in the attribute of "the attribute that has been notified" of the original resource.

Alternatively, the method further includes the following features:

after the CSE receives the resource update request, the method further includes the following step:

when it is judged that the value of the parameter of an attribute able to be notified is null and the original resource has created the attribute of "the attribute that has been notified", the CSE sends the resource update request to the remote CSE, and carries a notification resource address of the original resource on the remote CSE, the attribute name stored in the attribute of "the attribute that has been notified", and the attribute value thereof, herein the attribute value is set to be null.

Alternatively, the method further includes the following features:

when the CSE judges that the value of the parameter of an attribute able to be notified is null and the original resource has created the attribute of "the attribute that has been notified", while or after the CSE sends the resource update request to the remote CSE, the method further includes that "the attribute that has been notified" of the original resource is deleted.

Alternatively, the method further includes the following features.

When the CSE judges that the value of the parameter of an attribute able to be notified is null and the original resource has created the attribute of "the attribute that has been notified", after the CSE sends the resource update request to the remote CSE, the method further includes the following step:

when receiving a response for indicating the successful deletion of the attribute, the attribute of "the attribute that has been notified" of the original resource is deleted.

Alternatively, the method further includes the following features:

after the CSE receives the resource update request, the method further includes the following step:

when the original resource does not include the attribute of "has been notified to", the CSE feeds back, to the sender of the resource update request, a response message for indicating a failed resource update.

A method for implementing resource attribute notification includes the following steps:

a common service entity (CSE) receives a resource update request, herein the resource update request contains a notification resource address parameter and an attribute name and an attribute value of an attribute able to be notified; and the CSE finds a corresponding notification resource created locally according to the notification resource address parameter, when it is judged that the resource update request contains an attribute name of an attribute able to be notified and a non-null attribute value and the notification resource has not created an attribute corresponding to the attribute able to be notified, creates the attribute corresponding to the attribute able to be notified for the notification resource, and feeds back, to the sender of the resource update request, a response for indicating the successful creation of an attribute after the successful creation.

Alternatively, the method further includes the following features:

after the CSE receives the resource update request, the method further includes the following step:

when the CSE judges that the resource update request contains an attribute name of an attribute able to be notified and an attribute value which is set to be null, the attribute corresponding to the attribute able to be notified that the notification resource has created is deleted, and a response for indicating the successful deletion of the attribute is fed back to the sender of the resource update request after the successful deletion.

A common service entity includes:

a request receiving module arranged to receive a resource update request, herein the resource update request contains an original resource address parameter and a parameter of an attribute able to be notified; and an attribute notification processing module arranged to find a corresponding original resource and an attribute thereof created locally according to the original resource address parameter, and when it is judged that the parameter of an attribute able to be notified contains an attribute name of an attribute able to be notified, and the original resource has been notified to a remote CSE, but the original resource has not created "an attribute that has been notified", sending the resource update request to the remote CSE and carrying a notification resource address of the original resource on the remote CSE, the attribute name of the attribute able to be notified, and the attribute value stored locally.

Alternatively, the common service entity further includes the following features:

the attribute notification processing module being further arranged to: when it is judged that the parameter of an attribute able to be notified contains an attribute name of an attribute able to be notified, and the original resource has been notified to a remote CSE, but the original resource has not created "an attribute that has been notified", after sending the resource update request to the remote CSE, when the CSE receives a response for indicating the successful creation of an attribute, the attribute of "the attribute that has been notified" for the original resource is created, and the attribute name of the attribute able to be notified successfully created in the attribute of "the attribute that has been notified" of the original resource is stored.

Alternatively, the common service entity further includes the following features:

the attribute notification processing module being further arranged to: when it is judged that the parameter of an attribute able to be notified contains an attribute name of an attribute able to be notified, and the original resource has been notified to a remote CSE, but the original resource has not created "an attribute that has been notified", while or after sending the resource update request to the remote CSE, the attribute of "the attribute that has been notified" for the original resource is created. And when receiving a response for indicating the successful creation of an attribute, the attribute name of the attribute able to be notified successfully created in the attribute of "the attribute that has been notified" of the original resource is stored.

Alternatively, the common service entity further includes the following features:

the attribute notification processing module being further arranged to: after receiving the resource update request, when it is judged that the value of the parameter of an attribute able to be notified is null and the original resource has created the attribute of "the attribute that has been notified", the resource update request is sent to the remote CSE, and a notification resource address of the original resource is carried on the remote CSE, the attribute name stored in the attribute of "the attribute that has been notified", and the attribute value thereof, herein the attribute value is set to be null.

Alternatively, the common service entity further includes the following features:

the attribute notification processing module being further arranged to: when it is judged that the value of the parameter of an attribute able to be notified is null and the original resource has created the attribute of "the attribute that has been notified", while or after sending the resource update request to the remote CSE, delete "the attribute that has been notified" of the original resource.

Alternatively, the common service entity further includes the following features:

the attribute notification processing module being further arranged to: when it is judged that the value of the parameter of an attribute able to be notified is null and the original resource has created the attribute of "the attribute that has been notified", after sending the resource update request to the remote CSE, when receiving a response for indicating the successful deletion of the attribute, delete the attribute of "the attribute that has been notified" of the original resource.

Alternatively, the common service entity further includes the following features:

a feedback module being arranged to: after the request receiving module receives the resource update request, when the original resource does not include the attribute of "has been notified to", feeding back to the sender of the resource update request, a response message for indicating a failed resource update.

A common service entity includes:

a request receiving module arranged to receive a resource update request, herein the resource update request contains a notification resource address parameter and an attribute name and an attribute value of an attribute able to be notified; and an attribute creation and deletion processing module arranged to find a corresponding notification resource created locally according to the notification resource address parameter, when it is judged that the resource update request contains an attribute name of an attribute able to be notified and a non-null attribute value and the notification resource has not created an attribute corresponding to the attribute able to be notified, create the attribute corresponding to the attribute able to be notified for the notification resource, and feed back to the sender of the resource update request, a response for indicating the successful creation of an attribute after the successful creation.

Alternatively, the common service entity further includes the following features:

the attribute creation and deletion processing module being further arranged to: after the request receiving module receives the resource update request, when it is judged that the resource update request contains an attribute name of an attribute able to be notified and an attribute value which is set to be null, delete the attribute corresponding to the attribute able to be notified that the notification resource has created, and feed back to the sender of the resource update request, a response for indicating the successful deletion of the attribute after the successful deletion.

The embodiment of the present document also provides a computer program, including a program instruction, which, when executed by a common service entity, enables the common service entity to carry out the method described above.

The embodiment of the present document also provides a computer-readable storage medium carrying the above-mentioned computer program.

A method for implementing resource attribute notification and a common service entity provided by the embodiment of the present document create the corresponding attribute on the notification resource by notifying the attribute of the original resource to the remote CSE, so that the querier queries on the remote CSE directly with no need of being linked to the original resource when only needing to query the attribute of the resource. The speed and efficiency of the remote query are improved, the signaling generated in the query is reduced, and thereby the network resource is stored.

DETAILED DESCRIPTION

The embodiment of the present document will be elaborated below in combination with accompanying drawings. It shall be illustrated that embodiments in the present application and features in the embodiments may be randomly combined with each other in case of no conflicts.

Figures 1, 2:
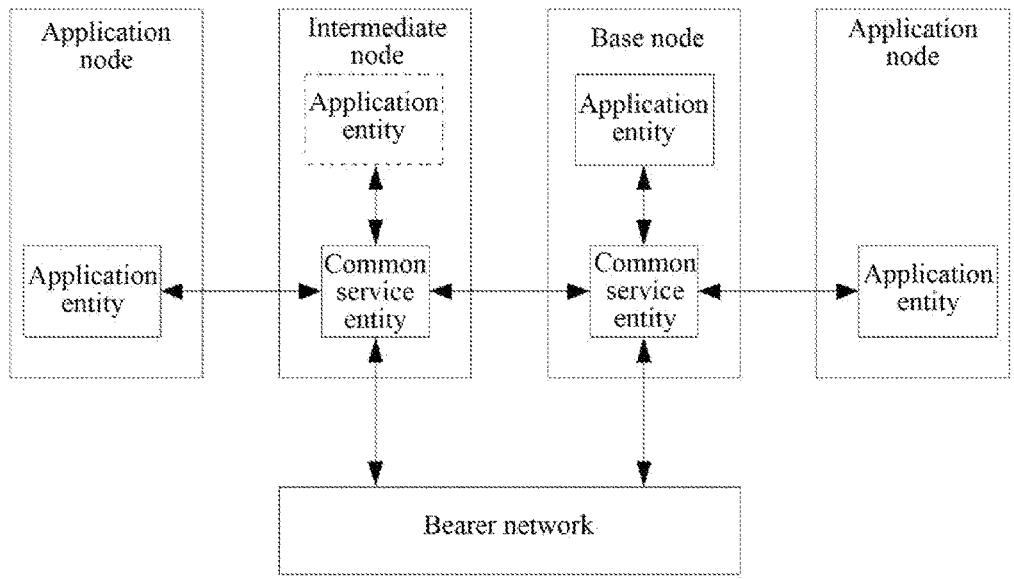
FIG. 1 is a schematic diagram of a machine type communication system in the related technology.
FIG. 2 is a flowchart of a method for implementing resource attribute notification (local CSE) according to an embodiment of the present document.

As shown in FIG. 2, the embodiments of the present invention provide a method for implementing resource attribute notification, herein the method includes that:

S10: a common service entity (CSE) receives a resource update request, herein the resource update request contains an original resource address parameter and a notifiable attribute parameter; and S20: the CSE finds a corresponding original resource and an attribute thereof created locally according to the original resource address parameter. If it is judged that the notifiable attribute parameter contains an attribute name of a notifiable attribute, and the original resource has been notified to a remote CSE but the original resource has not created "an attribute that has been notified", the CSE sends the resource update request to the remote CSE. The resource update request carries a resource notification address of the original resource on the remote CSE, the attribute name of the notifiable attribute, and the attribute value stored locally.

Herein, the CSE judges that the original resource has been notified to a remote CSE, including that: if the original resource includes the attribute of "has been notified to", the CSE judges that the original resource has been notified to a remote CSE.

Alternatively, if the CSE judges that the notifiable attribute parameter contains an attribute name of a notifiable attribute, and the original resource has been notified to a remote CSE, but the original resource has not created "an attribute that has been notified", after the CSE sends the resource update request to the remote CSE, the method further includes that:

if the CSE receives a response for indicating the successful creation attribute of an attribute, the attribute of "the attribute that has been notified" is created for the original resource, and the attribute name of the notifiable attribute successfully created is stored in the attribute of "the attribute that has been notified" of the original resource.

Alternatively, if the CSE judges that the notifiable attribute parameter contains an attribute name of a notifiable attribute, and the original resource has been notified to a remote CSE, but the original resource has not created "an attribute that has been notified", while or after the CSE sends the resource update request to the remote CSE, the CSE further includes that:

the CSE creates the attribute of "the attribute that has been notified" for the original resource; and if receiving the response for indicating the successful creation attribute of an attribute, the attribute name of the notifiable attribute successfully created is stored in the attribute of "the attribute that has been notified" of the original resource.

Herein, the attribute name of the notifiable attribute successfully created is stored in the attribute of "the attribute that has been notified" of the original resource, which means that the notifiable attribute has been notified to the remote CSE.

Alternatively, after the CSE receives the resource update request, the method further includes that:

if it is judged that the value of the notifiable attribute parameter is null and the original resource has created the attribute of "the attribute that has been notified", the CSE sends the resource update request to the remote CSE, and carries a resource notification address of the original resource on the remote CSE, the attribute name stored in the attribute of "the attribute that has been notified", and the attribute value thereof, herein the attribute value is set to be null.

Alternatively, if the CSE judges that the value of the notifiable attribute parameter is null and the original resource has created the attribute of "the attribute that has been notified", while or after the CSE sends the resource update request to the remote CSE, the CSE further includes that: "the attribute that has been notified" of the original resource is deleted.

Alternatively, if the CSE judges that the value of the notifiable attribute parameter is null and the original resource has created the attribute of "the attribute that has been notified", after the CSE sends the resource update request to the remote CSE, the CSE further includes that:

if receiving a response for indicating the successful deletion attribute of the attribute, the attribute of "the attribute that has been notified" of the original resource is deleted.

Alternatively, after the CSE receives the resource update request, the CSE further includes that:

if the original resource does not include the attribute of "has been notified to", the CSE feeds back, to the sender of the resource update request, a response message for indicating a failed resource update.

Figure 3:
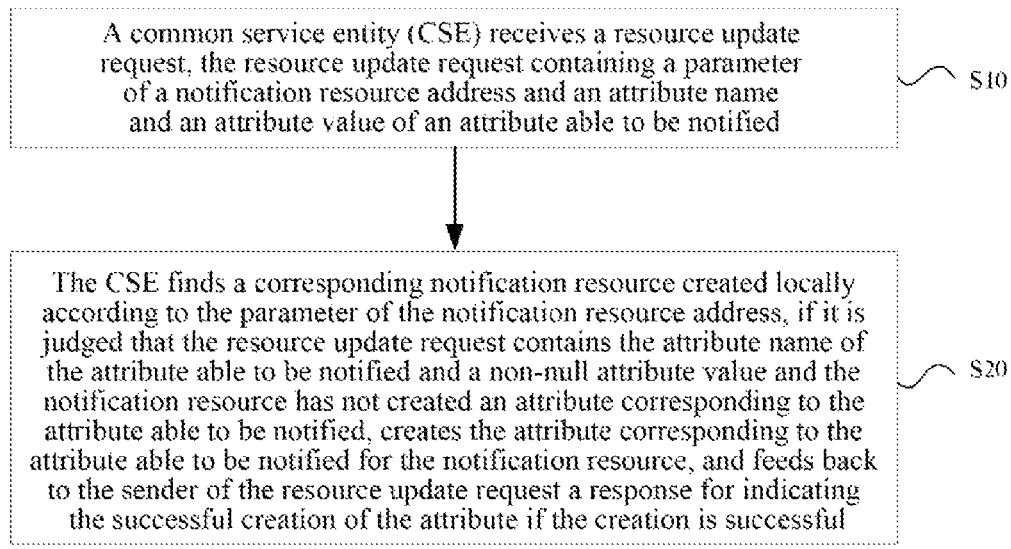
FIG. 3 is a flowchart of a method for implementing resource attribute notification (remote CSE) according to an embodiment of the present document.

As shown in FIG. 3, the embodiments of the present document provide a method for implementing resource attribute notification, herein the method includes that:

S10: a common service entity (CSE) receives a resource update request, herein the resource update request contains a notification resource address parameter and an attribute name and an attribute value of a notifiable attribute; and S20: the CSE finds a corresponding notification resource created locally according to the notification resource address parameter, if it is judged that the resource update request contains an attribute name of a notifiable attribute and a non-null attribute value and the notification resource has not created an attribute corresponding to the notifiable attribute, the CSE creates the attribute corresponding to the notifiable attribute for the notification resource, and feeds back, to the sender of the resource update request, a response for indicating the successful creation attribute of an attribute after the successful creation.

Alternatively, after the CSE receives the resource update request, the CSE further includes that:

if the CSE judges that the resource update request contains an attribute name of a notifiable attribute and an attribute value which is set to be null, the attribute corresponding to the notifiable attribute that the notification resource has created is deleted, and a response for indicating the successful deletion attribute is fed back to the sender of the resource update request if there is a successful deletion.

Figure 4:
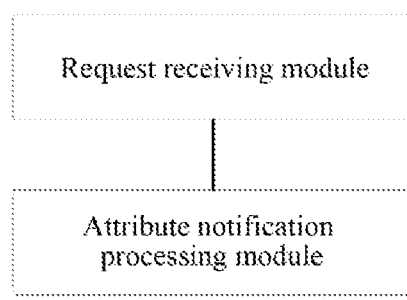
FIG. 4 is a structure diagram of a common service entity (local CSE) according to an embodiment of the present document.

As shown in FIG. 4, the embodiments of the present document provide a common service entity, herein the common service entity includes:

a request receiving module arranged to: receive a resource update request, herein the resource update request contains an original resource address parameter and a notifiable attribute parameter; and an attribute notification processing module arranged to: find a corresponding original resource and an attribute thereof created locally according to the original resource address parameter, and if it is judged that the notifiable attribute parameter contains an attribute name of a notifiable attribute, and the original resource has been notified to a remote CSE, but the original resource has not created "an attribute that has been notified", sending the resource update request to the remote CSE and carrying a resource notification address of the original resource on the remote CSE, the attribute name of the notifiable attribute, and the attribute value stored locally.

Alternatively, the attribute notification processing module is further arranged to: if it is judged that the notifiable attribute parameter contains an attribute name of a notifiable attribute, and the original resource has been notified to a remote CSE, but the original resource has not created "an attribute that has been notified", after sending the resource update request to the remote CSE, if the CSE receives a response for indicating the successful creation attribute of an attribute, create the attribute of "the attribute that has been notified" for the original resource, and store the attribute name of the notifiable attribute successfully created in the attribute of "the attribute that has been notified" of the original resource.

Alternatively, the attribute notification processing module is further arranged to: if it is judged that the notifiable attribute parameter contains an attribute name of a notifiable attribute, and the original resource has been notified to a remote CSE, but the original resource has not created "an attribute that has been notified", while or after sending the resource update request to the remote CSE, create the attribute of "the attribute that has been notified" for the original resource. The attribute notification processing module is further arranged to: if receiving a response for indicating the successful creation attribute of an attribute, store the attribute name of the notifiable attribute successfully created in the attribute of "the attribute that has been notified" of the original resource.

Alternatively, the attribute notification processing module is further arranged to: after receiving the resource update request, if it is judged that the value of the notifiable attribute parameter is null and the original resource has created the attribute of "the attribute that has been notified", send the resource update request to the remote CSE. The attribute notification processing module is further arranged to carry a resource notification address of the original resource on the remote CSE, the attribute name stored in the attribute of "the attribute that has been notified", and the attribute value thereof, herein the attribute value is set to be null.

Alternatively, the attribute notification processing module is further arranged to: if it is judged that the value of the notifiable attribute parameter is null and the original resource has created the attribute of "the attribute that has been notified", while or after sending the resource update request to the remote CSE, delete "the attribute that has been notified" of the original resource.

Alternatively, the attribute notification processing module is further arranged to: if it is judged that the value of the notifiable attribute parameter is null and the original resource has created the attribute of "the attribute that has been notified", after sending the resource update request to the remote CSE, if receiving a response for indicating the successful deletion attribute of the attribute, delete the attribute of "the attribute that has been notified" of the original resource.

Alternatively, the common service entity further includes:

a feedback module arranged to: after the request receiving module receives the resource update request, if the original resource does not include the attribute of "has been notified to", feeding back to the sender of the resource update request, a response message for indicating a failed resource update.

Figure 5:
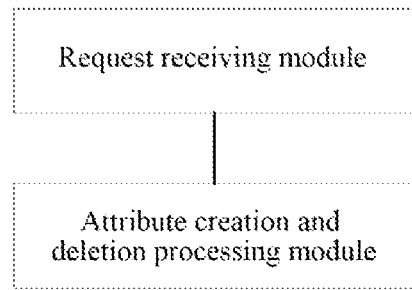
FIG. 5 is a structure diagram of a common service entity (remote CSE) according to an embodiment of the present document.

As shown in FIG. 5, the embodiments of the present document provide a common service entity, herein the common service entity includes:

a request receiving module arranged to: receive a resource update request, herein the resource update request contains a notification resource address parameter and an attribute name and an attribute value of a notifiable attribute; and an attribute creation and deletion processing module arranged to: find a corresponding notification resource created locally according to the notification resource address parameter, if it is judged that the resource update request contains an attribute name of a notifiable attribute and a non-null attribute value and the notification resource has not created an attribute corresponding to the notifiable attribute, create the attribute corresponding to the notifiable attribute for the notification resource, and feed back to the sender of the resource update request, a response for indicating the successful creation attribute of an attribute after the successful creation.

Alternatively, the attribute creation and deletion processing module is further arranged to: after the request receiving module receives the resource update request, if it is judged that the resource update request contains an attribute name of a notifiable attribute and an attribute value which is set to be null, delete the attribute corresponding to the notifiable attribute that the notification resource has created, and feed back to the sender of the resource update request a response for indicating the successful deletion attribute if there is a successful deletion.

Application Example 1

S101: the application entity AE sends a resource update request to the local CSE. Herein the request message contains an original resource address parameter and a parameter of an attribute able to be notified, and the parameter of an attribute able to be notified includes attribute names of attributes able to be notified.

For example, the value of the parameter of an attribute able to be notified includes attribute 1 of which the attribute name is "application name" and the attribute value is "myapplication". The original resource address is: LocalCSEroot/AE1.

S102: the local CSE reads the original resource address, confirms that the resource of the resource address is "AE1", checks the parameter of an attribute able to be notified, finds that the value thereof is non-null, checks whether the resource "AE1" has the attribute of "an attribute that has been notified", and if the checking result is not, the resource update request message is sent to the remote CSE, herein the resource update request message contains a notification resource address parameter and an attribute name and an attribute value of an attribute able to be notified.

For example, the notification resource address is: RemoteCSEroot/AE1_Annc; the value of the parameter of an attribute able to be notified includes attribute 1 of which the attribute name is "application name" and the attribute value is "myapplication". The notifiable resource address is acquired from the attribute of "has been notified to" of the original resource.

S103: after receiving the resource update request message, the remote CSE confirms that the resource to be updated is "AE1-Annc" according to the "resource address", creates the attribute "application name" in the resource "AE1-Annc", and sets the value to "myapplication". That is, the attribute value of the attribute created on the notification resource is the same as the attribute value of the attribute able to be notified of the original resource.

S104: the remote CSE sends a response message to the local CSE. Herein the response message contains an indication that the attribute is successfully created.

S105: after receiving the response message sent by the remote CSE, the local CSE creates "an attribute that has been notified" of the original resource and stores the attribute name of the attribute that has been successfully notified in the attribute of "an attribute that has been notified" of the resource "AE1".

In other implementations, the local CSE may also create an attribute the attribute of "an attribute that has been notified" for the resource "AE1" after receiving the resource update request message, and then stores the attribute name of the attribute that has been successfully notified in the attribute of "an attribute that has been notified" of the resource "AE1" after receiving the response message sent by the remote CSE.

Application Example 2

S101: the application entity AE sends a resource update request to the local CSE, herein the request message contains an original resource address parameter and a parameter of an attribute able to be notified, and the value of the parameter of an attribute able to be notified is null.

Herein, the original resource address is: LocalCSEroot/AE1.

S102: the local CSE reads the original resource address, confirms that the resource of the resource address is "AE1", checks the parameter of an attribute able to be notified, and finds that the value thereof is null, and the local CSE further checks whether the resource "AE1" contains the attribute of "an attribute that has been notified", and if the checking result is yes, sends the resource update request message to the remote CSE, herein the resource update request message contains a notification resource address parameter and an attribute name of an attribute able to be notified and an attribute value which is set to be null. That is, the resource update request message contains the attribute name stored in the attribute of "an attribute that has been notified" of the original resource, and the attribute value of each attribute is set to be null.

Herein, the notification resource address is for example: RemoteCSEroot/AE1_Annc.

S103: after receiving the resource update request message, the remote CSE confirms that the resource needing to be updated is "AE1-Annc" according to the "resource address", and deletes the attribute from the resource "AE1-Annc".

S104: the remote CSE sends a response message to the local CSE. Herein the response message contains an indication that the attribute is successfully deleted.

S105: after receiving the response of successfully deleting the attribute, the local CSE deletes the attribute.

In other implementations, the local CSE may delete the attribute of "an attribute that has been notified" of the resource "AE1" after sending the resource update request to the address in "has been notified to".

A method for implementing resource attribute notification and a common service entity provided by the abovementioned embodiment creates the corresponding attribute on the notification resource by notifying the attribute of the original resource to the remote CSE, so that the querier queries on the remote CSE directly without being linked to the original resource when only needing to query the attribute of the resource. The speed and efficiency of the remote query are improved, the signaling generated in the query is reduced, and thereby the network resource is stored.

Those skilled in the art may understand that all or some of the steps in the abovementioned embodiment may be implemented by a program instructing the associated hardware. The program may be stored in a computer-readable storage medium, such as a read-only memory, a magnetic disk, or an optical disk, and etc. In an exemplar embodiment, all or some of the steps in the abovementioned embodiment may also be implemented by using one or more integrated circuits, and accordingly, each module/unit in the abovementioned embodiment may be implemented in a form of hardware, and may also be implemented in a form of a software function module. The present document is not limited to any particular combination of hardware and software.

It shall be illustrated that the present document may have various other embodiments, and various changes and modifications may be made by those skilled in the art in accordance with the present document without departing from the spirit and essence of the present document, but all these corresponding changes and modifications belong to the scope of protection of the claims appended to the present document.

INDUSTRIAL APPLICABILITY

A method for implementing resource attribute notification and a common service entity provided by the embodiment of the present document create the corresponding attribute on the notification resource by notifying the attribute of the original resource to the remote CSE, so that the querier queries on the remote CSE directly without being linked to the original resource when only needing to query the attribute of the resource. The speed and efficiency of the remote query are improved, the signaling generated in the query is reduced, thereby the network resource is stored.

What I claim is:

1. A method for implementing resource attribute notification, comprising:
   receiving, by a common service entity (CSE), a resource update request, wherein the resource update request contains an original resource address parameter and a parameter of an announced attribute; and
   finding, by the CSE, a original resource created locally and an attribute according to the original resource address parameter, and when it is judged that the parameter of an announced attribute contains an attribute name of an announced attribute, and the original resource has been notified to a remote CSE, but the CSE has not created an attribute indicating that the original resource has been notified, sending by the CSE the resource update request to the remote CSE wherein the resource update request carries a notification resource address of the original resource on the remote CSE, the attribute name of the announced attribute, and the attribute value stored locally.

2. The method according to claim 1, wherein the method further comprises:
   when the CSE receives a response for indicating successful creation of an attribute, creating the attribute indicating that the original resource has been notified for the original resource, and storing the attribute name of the announced attribute in the attribute indicating that the original resource has been notified.

3. The method according to claim 1, wherein the method further comprises:
   creating, by the CSE, the attribute indicating that the original resource has been notified for the original resource; and when receiving a response for indicating successful creation of an attribute, storing the attribute name of the announced attribute in the attribute indicating that the original resource has been notified.

4. The method according to claim 2, wherein after the CSE receives the resource update request, the method further comprises:

when it is judged that the value of the parameter of an announced attribute is null and the remote CSE has created the attribute indicating that the original resource has been notified, sending by the CSE the resource update request to the remote CSE, wherein the resource update request carries a notification resource address of the original resource on the remote CSE, and an attribute name and attribute value stored in the attribute indicating that the original resource has been notified.

5. The method according to claim 4, wherein
when the CSE judges that the value of the parameter of an announced attribute is null and the remote CSE has created the attribute indicating that the original resource has been notified, while or after the CSE sends the resource update request to the remote CSE, the method further comprises: deleting the attribute indicating that the original resource has been notified of the original resource.

6. The method according to claim 4, wherein
when the CSE judges that the value of the parameter of an announced attribute is null and the remote CSE has created the attribute indicating that the original resource has been notified, after the CSE sends the resource update request to the remote CSE, the method further comprises:
when receiving a response for indicating successful deletion of the attribute, deleting the attribute indicating that the original resource has been notified of the original resource.

7. The method according to claim 1, wherein
after the CSE receives the resource update request, the method further comprises:
when the original resource does not include the attribute indicating that the original resource has been notified, feeding back, by the CSE, to the sender of the resource update request, a response message for indicating a failed resource update.

8. A method for implementing resource attribute notification, comprising:
receiving, by a common service entity (CSE), a resource update request, wherein the resource update request contains a notification resource address parameter and an attribute name and an attribute value of an announced attribute; and
finding by the CSE a notification resource created locally according to the notification resource address parameter, when it is judged that the resource update request contains an attribute name of an announced attribute and a non-null attribute value and the CSE has not created an attribute corresponding to the announced attribute, creating the attribute corresponding to the announced attribute for the notification resource, and feeding back, to the sender of the resource update request, a response for indicating successful creation of an attribute after the successful creation.

9. The method according to claim 8, wherein
after the CSE receives the resource update request, the method further comprises:
when the CSE judges that the resource update request contains an attribute name of an announced attribute and an attribute value which is set to be null, deleting the attribute corresponding to the announced attribute, and feeding back, to the sender of the resource update request, a response for indicating successful deletion of the attribute after the successful deletion.

10. A common service entity, comprising:
a request receiving module arranged to: receive a resource update request, wherein the resource update request contains an original resource address parameter and a parameter of an announced attribute; and
an attribute notification processing module arranged to: find a original resource created locally and an attribute according to the original resource address parameter, and when it is judged that the parameter of an announced attribute contains an attribute name of an announced attribute, and the original resource has been notified to a remote CSE, but the CSE has not created an attribute indicating that the original resource has been notified, sending the resource update request to the remote CSE wherein the resource update request carries a notification resource address of the original resource on the remote CSE, the attribute name of the announced attribute, and the attribute value stored locally.

11. The common service entity according to claim 10, wherein
the attribute notification processing module is further arranged to: create the attribute indicating that the original resource has been notified for the original resource, and store the attribute name of the announced attribute in the attribute indicating that the original resource has been notified.

12. The common service entity according to claim 10, wherein
the attribute notification processing module is further arranged to: create the attribute indicating that the original resource has been notified for the original resource; and when receiving a response for indicating successful creation of an attribute, store the attribute name of the announced attribute in the attribute indicating that the original resource has been notified.

13. The common service entity according to claim 11, wherein
the attribute notification processing module is further arranged to: after receiving the resource update request, when it is judged that the value of the parameter of an announced attribute is null and the remote CSE has created the attribute indicating that the original resource has been notified, send the resource update request to the remote CSE, wherein the resource update request carries a notification resource address of the original resource on the remote CSE, and an attribute name and attribute value stored in the attribute indicating that the original resource has been notified.

14. The common service entity according to claim 13, wherein
the attribute notification processing module is further arranged to: when it is judged that the value of the parameter of an announced attribute is null and the remote CSE has created the attribute indicating that the original resource has been notified, while or after sending the resource update request to the remote CSE, delete the attribute of the attribute indicating that the original resource has been notified of the original resource.

15. The common service entity according to claim 14, wherein
the attribute notification processing module is further arranged to: when it is judged that the value of the parameter of an announced attribute is null and the remote CSE has created the attribute indicating that the original resource has been notified, after sending the resource update request to the remote CSE, when receiving a response for indicating successful deletion of the attribute, delete the attribute indicating that the original resource has been notified of the original resource.

16. The common service entity according to claim 10, wherein the common service entity further comprises:
a feedback module arranged to: after the request receiving module receives the resource update request, when the original resource does not include the attribute indicating that the original resource has been notified, feed back to the sender of the resource update request a response message for indicating a failed resource update.

17. A common service entity, comprising:
a request receiving module arranged to: receive a resource update request, wherein the resource update request contains a notification resource address parameter and an attribute name and an attribute value of an announced attribute; and
an attribute creation and deletion processing module arranged to: find a notification resource created locally according to the notification resource address parameter, when it is judged that the resource update request contains an attribute name of an announced attribute and a non-null attribute value and the CSE has not created an attribute corresponding to the announced attribute, create the attribute corresponding to the announced attribute for the notification resource, and feed back to the sender of the resource update request a response for indicating successful creation of the attribute after the successful creation.

18. The common service entity according to claim 17, wherein
the attribute creation and deletion processing module is further arranged to: after the request receiving module receives the resource update request, when it is judged that the resource update request contains an attribute name of an announced attribute and an attribute value which is set to be null, delete the attribute corresponding to the announced attribute, and feed back, to the sender of the resource update request, a response for indicating successful deletion of the attribute after the successful deletion.

19. A non-transitory computer-readable storage medium comprising a program instruction, which, when executed by a common service entity, enables the common service entity to carry out the method according to claim 1.

* * * * *